E. N. LIGHTFOOT.
ELECTRICALLY HEATED BED LASTING MACHINE.
APPLICATION FILED MAR. 19, 1917.
1,245,746.
Patented Nov. 6, 1917.
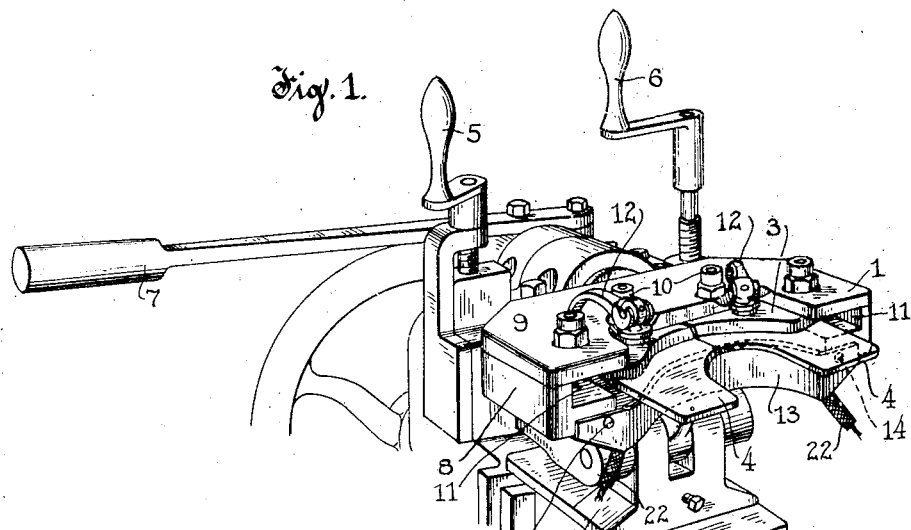
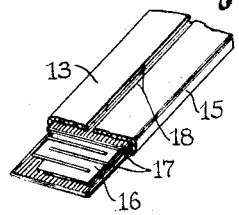
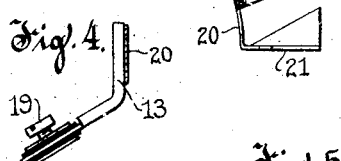
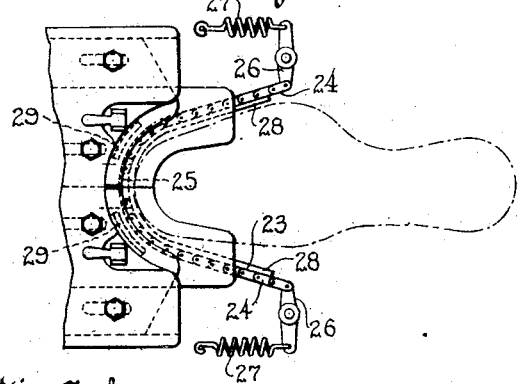
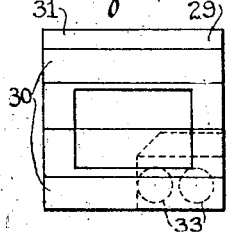
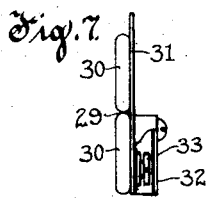
Inventor
Edwin N. Lightfoot
By Frank M. Hubbard
Attorney

UNITED STATES PATENT OFFICE.

EDWIN N. LIGHTFOOT, OF NEW YORK, N. Y., ASSIGNOR TO THE CUTLER-HAMMER MFG. CO., OF MILWAUKEE, WISCONSIN, A CORPORATION OF WISCONSIN.

ELECTRICALLY-HEATED BED-LASTING MACHINE.

1,245,746.   Specification of Letters Patent.   Patented Nov. 6, 1917.

Application filed March 19, 1917. Serial No. 155,785.

*To all whom it may concern:*

Be it known that I, EDWIN N. LIGHTFOOT, a citizen of the United States, residing at New York, in the county of Bronx and State of New York, have invented new and useful Improvements in Electrically-Heated Bed-Lasting Machines, of which the following is a full, clear, concise, and exact description, reference being had to the accompanying drawing, forming a part of this specification.

This invention relates to bed lasting machines and more particularly to means for heating the same electrically.

These machines are employed in the manufacture of shoes for forcing the upper over the inner sole and temporarily securing the same in place, heat being applied to the movable engaging members or wipers of the machine to cause the same to smooth and iron the crimped portions of the upper to produce a smooth finished surface and a regular junction between the upper and the sole.

Machines of this character have heretofore been heated by means of steam chambers or coils located in the movable head of the machine and fed through flexible rubber tubes which deteriorate rapidly and by frequent bursting occasion almost endless annoyance and expense, particularly since each rupture incapacitates the entire machine pending repairs, whereby the efficiency of the machine is seriously impaired. Also, it has been proposed to heat the entire head of the machine electrically, but this method has been found wasteful and generally inefficient since only a small percentage of the heat developed ever reaches the parts for which it is intended.

The present invention has among its objects to provide electric heating means for machines of the type stated which shall be both durable in construction and efficient.

A further object is that of confining the heating effect of such means substantially to those parts of the machine in which heat is desirable.

A still further object is to reduce the current consumption of the heating means in machines of the type stated.

Other objects and advantages will hereinafter appear.

In the accompanying drawing, wherein are illustrated certain embodiments of the invention, Figure 1 is a perspective view showing certain essential features of a lasting machine and the application of heating means thereto;

Figs. 2, 3 and 4 are enlarged detail views of the heating element shown in Fig. 1;

Fig. 5 is a plan view showing the application of heating means to a slightly different type of lasting machine;

Figs. 6 and 7 are enlarged detail views of the heating means shown in Fig. 5.

Referring to the drawing, and particularly to Fig. 1, the machine there illustrated which is of known construction, comprises a head member 1 hingedly mounted upon an adjustable base or table 2, a carrier 3 mounted for reciprocation within the head 1, and wipers 4, 4 movable with said carrier. Suitable adjustment screws 5, 6 are provided for effecting proper positioning of the head 1, while a lever 7 constitutes means for manually actuating the carrier 3 and attached wipers.

The head member 1 comprises essentially a main casting 8 having a removable top 9 secured thereon by means of bolts 10, said head being concaved on its front or working face to substantially fit the portion of the shoe undergoing the lasting process and provided with channels 11, 11 to receive and guide the side edges of the carrier 3. The wipers 4 are secured to the lower face of the carrier by means of cam operated bolts 12, whereby the said wipers may be readily removed and exchanged to adapt the machine to the different sizes and shapes of stock to be lasted.

In the lasting operation the lever 7 is actuated to move the wipers 4 longitudinally of the shoe which is held stationary with respect thereto, to fold and crimp the material of the upper in proper relation about the inner sole. It is thus apparent that heat is only necessary in the wipers and in the working face of the head casting which is adjacent the shoe during the lasting operation.

In order to heat the said parts electrically a flat elongated crescent shaped heating element 13 is secured by means of screws 14 directly to the concave working face of the head casting 8 immediately below but not in contact with the wipers whereby that portion of the head which is adjacent the shoe during the lasting operation is heated by direct contact with the heating element while the wipers also are heated by convection. The remaining parts of the machine are relatively unaffected by the heating element whereby the operation of the machine is facilitated and both the current consumption and the temperature of the surrounding air are maintained at a minimum.

The heating element 13 includes a heating unit 15 of the type described and claimed in the Patent No. 1,150,426, granted Aug. 17, 1915 to W. S. Hadaway, Jr., comprising a resistance strip 16 faced by insulating sheets 17 and surrounded by a sheet metal shield 18, said resistance strip being provided with suitable screw terminals 19. The above described unit is welded or otherwise secured to a thin strip of metal 20 and curved to approximately the contour of the working face to which it is secured, the ends of the metallic strip 20 being outwardly bent forming attaching lugs 21 shaped to substantially fit the engaged portions of the head casting 8. The unit terminals are bent downwardly and rearwardly beneath the lasting head for connection with appropriate flexible current conductors 22, whereby the said connections are fully protected against injury and complete freedom of movement of the head is provided.

Referring particularly to Fig. 5, the lasting machine there illustrated is in most essentials similar to that hereinbefore described but differs therefrom particularly in the addition of a flexible member 23 which serves to center and support the shoe during the lasting operation. The said flexible member comprises a pair of chains 24 secured centrally of the lasting head to a projection 25 on the face of the head casting, said chains being terminally connected respectively to a pair of pivoted levers 26, while springs 27 act upon said levers to tension the said chains. A flexible strip 28 extends within the said chains to line the same thereby protecting the shoe against undue wear.

In the above described construction heat is supplied to the wipers and to the flexible chain member which surrounds the shoe by means of a pair of heating elements 29 attached to the head casting, one on either side of the central extension 25 thereof.

The heating elements 29 are of similar construction and each as shown in Figs. 6 and 7 is composed of a pair of relatively short heating unit sections 30 welded upon a rectangular piece of sheet metal 31 having a portion 32 reflexed to constitute attaching means, the heating units being similar to that shown in Fig. 3 and being provided with terminals 33 for the attachment of flexible conductors as above described.

The heating means being secured directly to the working face of the head casting below the wipers in no wise interferes with the normal operation of the machine and moreover is fully protected against injury or accidental contact by the operator, while by this arrangement substantially the entire heat output is directed to the wipers and other parts, the heating of which is necessary or desirable.

What I claim as new and desire to secure by Letters Patent is:

1. In a bed lasting machine, in combination, a movable lasting head, wipers associated with said head and movable with respect thereto and electric heating means secured to said head immediately below said wipers for supplying heat thereto.

2. In a bed lasting machine, in combination, a lasting head, and electric heating means secured to said head to substantially conform to the contour of the work under operation for supplying heat thereto and to the adjacent portion of said head.

3. In a bed lasting machine, in combination, an adjustable lasting head, a carrier member mounted for reciprocation with respect to said head, wipers secured to said carrier, said head having a working face shaped to substantially conform to the contour of the work to be acted on, and electric heating means for said machine secured against said working face beneath said wipers for heating the same and the adjacent portion of said head.

4. In a bed lasting machine, in combination, an adjustable lasting head, a carrier member movably mounted within said head, wipers secured to said carrier member, a flexible member secured to a projecting portion of said working face, and electric heating means secured to said head below said wipers for supplying heat thereto and to said flexible member.

5. In a bed lasting machine, in combination, a lasting head, a heating element secured thereto, said heating element being provided with attached terminals projecting beneath said head for connection with suitable conductors, whereby said terminals are protected by said head.

In witness whereof, I have hereunto subscribed my name.

EDWIN N. LIGHTFOOT.

Witnesses:
G. P. BROCKWAY,
HENRY DIERKS.